US008170248B2

(12) United States Patent
Hersbach et al.

(10) Patent No.: US 8,170,248 B2
(45) Date of Patent: May 1, 2012

(54) FEEDBACK COMPENSATION IN A SOUND PROCESSING DEVICE

(75) Inventors: Adam Hersbach, The Patch (AU); Ralph Peter Derleth, Hinwil (CH)

(73) Assignee: Phonak AG, Staefa (CH)

( * ) Notice: Subject to any disclaimer, the term of this patent is extended or adjusted under 35 U.S.C. 154(b) by 934 days.

(21) Appl. No.: 12/093,185

(22) PCT Filed: Nov. 10, 2006

(86) PCT No.: PCT/AU2006/001677
§ 371 (c)(1),
(2), (4) Date: May 9, 2008

(87) PCT Pub. No.: WO2007/053896
PCT Pub. Date: May 18, 2007

(65) Prior Publication Data

US 2008/0279395 A1 Nov. 13, 2008

(30) Foreign Application Priority Data

Nov. 11, 2005 (AU) ................................ 2005232314

(51) Int. Cl.
*H04R 25/00* (2006.01)
*G01L 9/00* (2006.01)

(52) U.S. Cl. ........................................ 381/318; 257/416

(58) Field of Classification Search .................... 381/60, 381/71.11, 318, 321; 257/416
See application file for complete search history.

(56) References Cited

U.S. PATENT DOCUMENTS

| | | | | |
|---|---|---|---|---|
| 5,533,120 | A | 7/1996 | Staudacher | |
| 6,898,293 | B2 * | 5/2005 | Kaulberg | 381/318 |
| 7,756,276 | B2 * | 7/2010 | Hersbach et al. | 381/60 |
| 2002/0191799 | A1 | 12/2002 | Nordqvist | |
| 2004/0125973 | A1 | 7/2004 | Fang et al. | |
| 2004/0136557 | A1 | 7/2004 | Kaulberg | |
| 2005/0094827 | A1 | 5/2005 | McDermott et al. | |
| 2005/0226427 | A1 | 10/2005 | Hersbach et al. | |

FOREIGN PATENT DOCUMENTS

| | | | |
|---|---|---|---|
| AU | 2003236382 | A1 | 8/2003 |
| EP | 0329383 | A2 | 8/1989 |
| EP | 04005270 | A1 | 6/1990 |
| EP | 1191814 | A1 | 3/2002 |
| GB | 1597501 | | 9/1981 |
| WO | 0110170 | A2 | 2/2001 |
| WO | 2005096670 | A1 | 10/2005 |

OTHER PUBLICATIONS

Supplementary European Search Report for EP 06 80 4498 dated Aug. 31, 2010.
International Search Report dated Nov. 27, 2006.
Written Opinion dated Nov. 27, 2006.

* cited by examiner

*Primary Examiner* — Calvin Lee
(74) *Attorney, Agent, or Firm* — Pearne & Gordon LLP

(57) ABSTRACT

There is disclosed a sound processing device (300) configured to apply a frequency shift to at least one frequency component of a received sound signal and to amplify at least part of the received sound signal. The processing device (300) is also adapted to generate an estimated feedback signal for combination with the received sound signal via a phase inverting feedback canceller (314). Associated methods (400, 600) of processing a sound signal are also disclosed.

18 Claims, 5 Drawing Sheets

FEEDBACK COMPENSATION IN A SOUND PROCESSING DEVICE

FIELD OF THE INVENTION

The present invention relates generally to a method and device for processing of sound signals. In a preferred form the invention relates to a sound signal processing that involves the use of frequency transposition to compensate for feedback in the audio amplification device. Embodiments of the present invention may be suitable for use in hearing aids, and it will be convenient to describe the invention in relation to that exemplary application. It will be appreciated however, that the invention is not limited to use in that application only.

BACKGROUND OF THE INVENTION

Feedback in an audio amplifier occurs when the acoustic signal from the output transducer finds its way back to the input transducer of the amplifier, thus creating a feedback loop. In audio amplifiers such as hearing aids, feedback can result in audible whistling or howling.

In a hearing aid, feedback occurs when the sound delivered to the ear canal leeks back to the microphone input. There are many feedback paths for sound to take, the most significant of which is via an open vent in the ear mould, although other paths such as gaps between the ear mould of the hearing aid and the ear, do exist. When fitting a hearing aid with a very high gain, it would be desirable to completely block the vent to improve feedback problems due to the high gain. However, it is not practical to completely block the ear mould vent for several reasons. Blocking the vent completely causes ear occlusion resulting in changes to the sound of the wearer's own voice. Moreover, blocking the vent prevents air flow needed for hygiene and comfort of the wearer, and reduces the transmission of unaided low frequency sounds into the ear.

A theoretical model of a hearing aid system is shown in FIG. 1. In this Figure, H is the forward transfer function of the hearing aid amplifier, and G is the transfer function of all combined feedback paths. If there is a vent in the ear mould, the transfer function G is dominated by the feedback path via the open vent. Both transfer functions H and G are complex functions of frequency. In order to minimise the above described problems resulting from the feedback loop in the model shown in this figure, various types of feedback cancellation systems have been proposed.

Typical feedback cancellation systems are based on altering the gain or the sound signal over the range of frequencies where feedback occurs. However, reduction of gain over a wide range of frequencies is not advantageous if the amplifier does not achieve the desired output level. Using a feedback detection algorithm, narrow band high intensity sounds can be detected and interpreted as the onset of feedback oscillation. A tuneable notch filter can be used to reduce the gain over a narrow frequency range, centered on the detected frequency. Some feedback cancellation systems employ several tuneable notch filters in a situation where the closed loop gain becomes unstable at several frequencies simultaneously.

Another approach to feedback avoidance that has been used is the use of frequency translating amplifiers. A frequency translating amplifier is one which transposes the frequency of the input sound signal, either upward or downward, in addition to amplifying the signal before sending it to the output transducer. One such frequency translating amplifier is described in European patent application EP04/005270.6 entitled "Method for frequency transposition and use of the method in a hearing device and a communication device," in the name of Phonak AG. The manner in which a frequency translating amplifier operates is illustrated by the model shown in FIG. 2.

In such a system, a frequency transposing component referenced T is added to the output of the forward path transfer function of the simple closed loop feedback system shown in FIG. 1. The frequency of the amplified external signal is translated to a different frequency. The receiver output, and hence the feedback signal, is now at a different frequency from that of the external input signal so that successive summation of a signal at the microphone input at a particular frequency cannot occur. As described in M. R. Schroeder, "Improvement of acoustic-feedback stability by frequency shifting," J. Acoust. Soc. Am. 36, 1718-1724~1964 the amount of frequency transposition required is very small, and may typically be in the order of 5 Hertz for a frequency transposition public address system.

Frequency translation makes an amplifier stable for the same gain that would otherwise cause instability, and hence howling, without frequency transposition. However, a frequency translating hearing aid may be stable in terms of its closed loop gain, but when the hearing aid forward gain is equal to or greater than the attenuation of the feedback path, unwanted artefacts are introduced which decrease the quality of the sound. One such method of reducing these artefacts is described in Australian patent application 2003236382 entitled "Feedback suppression in sound signal processing using frequency transposition," and its corresponding U.S. patent application Ser. No. 10/921,550, both assigned to Phonak AG.

Another approach to feedback reduction in audio amplification devices that has been adopted is the phase inverting feedback canceller. These cancellers operate by taking the correlation between the actual microphone input signal and a previous output signal sent to the receiver, and cancelling the correlated component. However such systems cannot distinguish between correlations introduced by the source signal (e.g. vowels or tonal components in music) and correlations introduced by the feedback signal. As a result these devices are better described as being correlation-cancellers, in the sense that rather than acting only on feedback signals such systems effectively cancel any input signal that correlates with the receiver output.

Accordingly, it is an object of an embodiment of the present invention to provide a method of processing a sound signal that addresses at least one of drawbacks of the prior art.

It is an object of an embodiment of the present invention to provide a device or processing a sound signal that addresses at least one of drawbacks of the prior art.

The applicant does not concede that the prior art discussed herein forms part of the common general knowledge in the art at the priority date of the application.

SUMMARY OF THE INVENTION

In one aspect the present invention provides a sound processing device including:

a sound receiving stage for receiving a sound signal;

frequency transposition stage for applying frequency change to at least one frequency component of the received sound signal;

an amplification stage configured to amplify at least part of the received sound signal;

a feedback estimation stage configured to generate an estimated feedback signal on the basis of an output of at least one of the sound receiving stage, the frequency transposition stage, the amplification stage and the sound processing device; and a phase inverting feedback cancelling stage configured to combine the estimated feedback signal with the input signal to cancel a feedback component of the sound signal received at the sound receiving stage.

The sound processing device may further include a frequency transposition activation stage configured to activate and/or deactivate the frequency transposition stage. The sound processing device may also include a rate of feedback estimation of the feedback estimation stage which is variable.

The feedback estimation stage of the sound processing device may be configured to estimate the feedback signal at a first rate when the frequency transposition stage is activated.

The feedback estimation stage may further be configured to estimate the feedback signal at a second rate when the frequency transposition stage is inactive.

The sound processing device may be configured such that the first rate is higher than the second rate.

The sound processing device may further include a sound classification stage configured to classify the received sound signal and cause the frequency transposition activation stage to control the operation of the frequency transposition stage in accordance with one of a plurality of frequency transposition activation schemes.

The frequency transposition activation stage may be configured to periodically activate the frequency transposition stage, and may be configured to activate the frequency transposition stage at an activation rate dependent upon the determined classification of the received sound signal.

The duration of activation of the frequency transposition stage may be determined on the basis of the determined classification of the received sound signal.

The sound receiving stage can be configured to receive either an acoustic signal or data signal representing an acoustic signal.

In a second aspect, the present invention provides a method of processing a sound signal in a sound processing device, the method including:

(a) receiving an input sound signal;

(b) applying a frequency change to one or more frequency components of the received sound signal, at least intermittently;

(c) amplifying at least a portion of the received sound signal;

(d) generating an estimated feedback signal corresponding to a feedback path of the sound processing device at least when said frequency transposition is applied; and (e) combining the received sound signal with a phase inverted representation of the estimated feedback signal to cancel feedback from the received sound signal.

The frequency change may be selectively activated or deactivated.

The method of processing a sound signal may further include:

classifying the received sound signal;

applying a frequency transposition activation scheme on the basis of said classification.

During a period in which a frequency change is applied to one or more frequency components of the received sound signal, steps (d) and (e) of the method of processing a sound signal may be performed such that the feedback cancellation is performed with a first adaptation speed.

Further, during a period in which a frequency change is not applied, steps (d) and (e) may be performed such that the feedback cancellation is performed with a second adaptation speed. The first adaptation speed may be faster than the second adaptation speed.

BRIEF DESCRIPTION OF THE DRAWINGS

Embodiments of the present invention will now be described with reference to the accompanying drawings to facilitate an understanding of the invention. It is to be understood that the invention is however not limited to the illustrative embodiments illustrated in the drawings. In the drawings.

DETAILED DESCRIPTION OF THE EMBODIMENTS

A preferred embodiment of the present invention will now be described in connection with the FIGS. 3 and 4.

Figure 1:
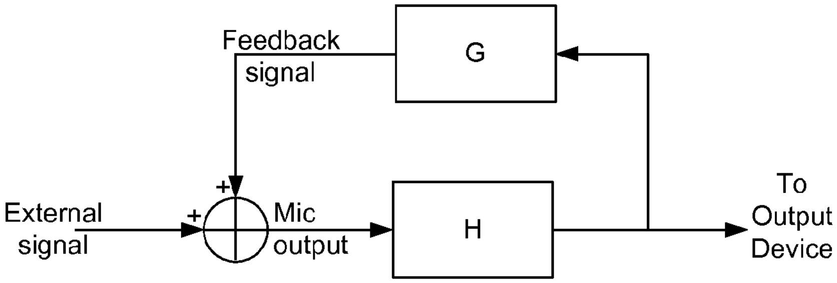
Fig. 1 PRIOR ART
FIG. 1 is a schematic diagram illustrating a model of a sound amplification device including a forward transfer path and a feedback path.
Figure 2:
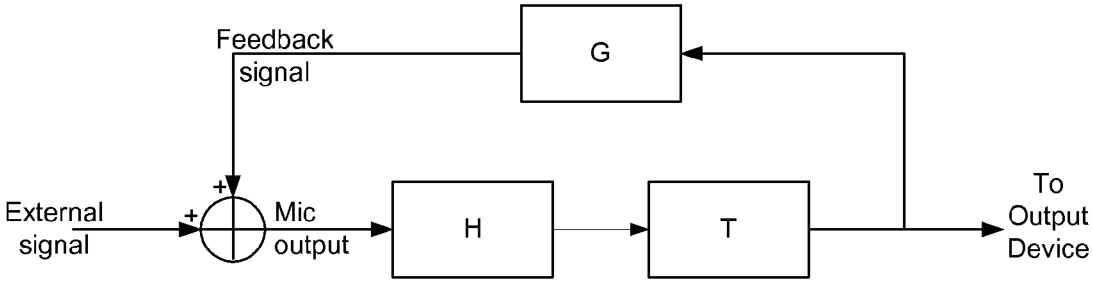
Fig. 2 PRIOR ART
FIG. 2 is a schematic diagram illustrating a model of a sound amplification device using frequency translation to minimise the effect of feedback.
Figure 3:
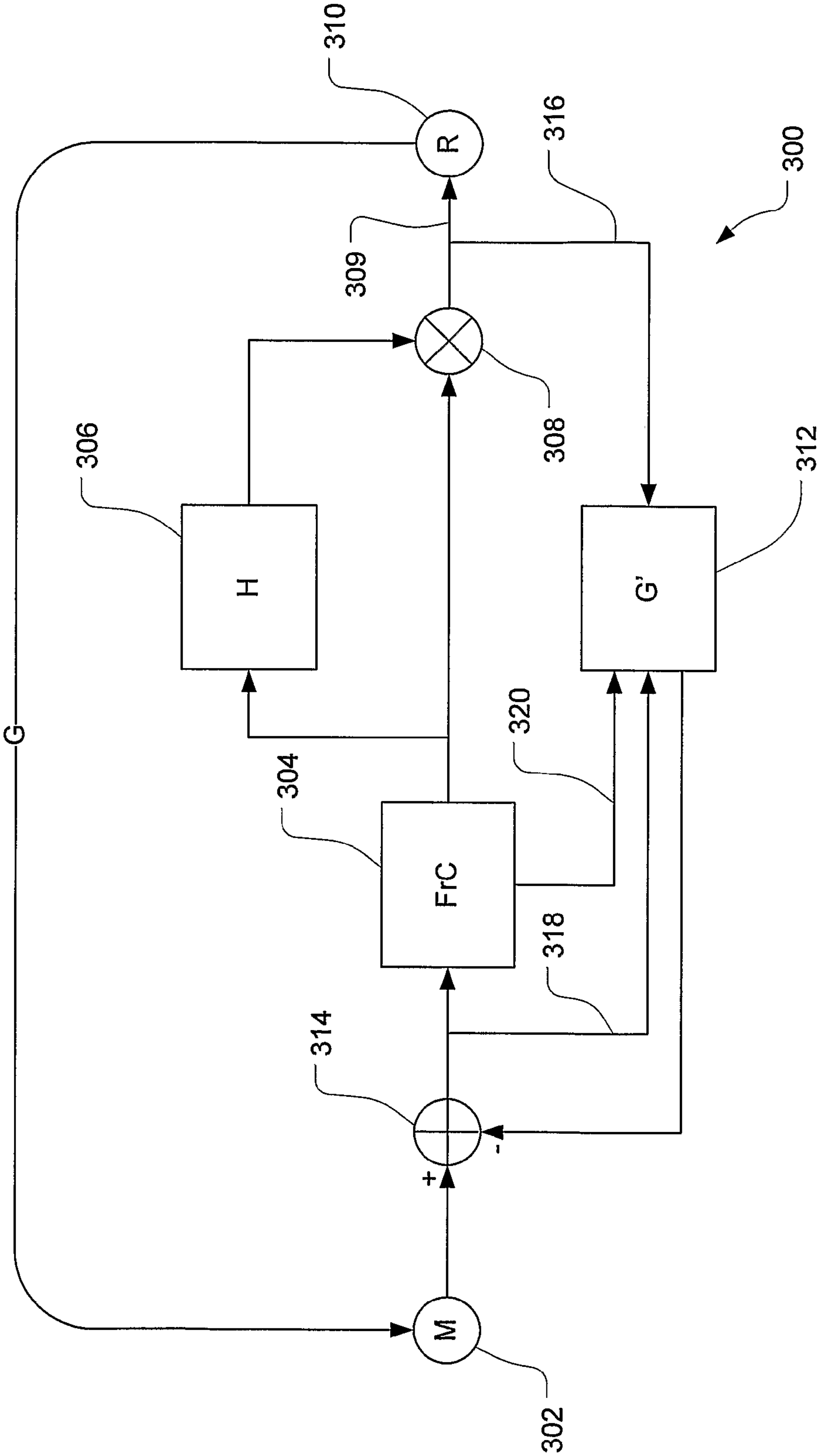
FIG. 3 is a schematic diagram illustrating a sound processing device according to an embodiment of the present invention.
Figure 4:
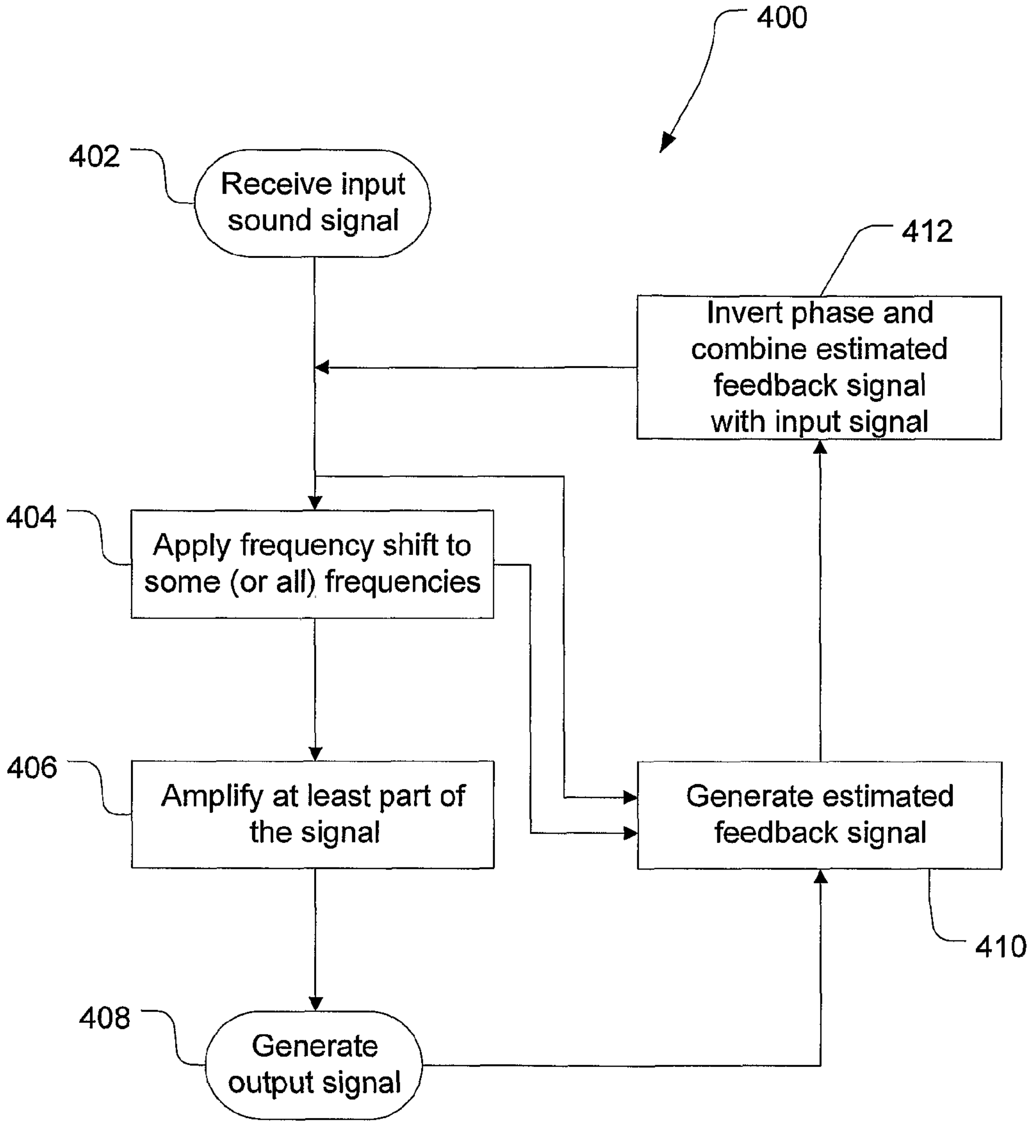
FIG. 4 is a flow chart depicting the sound processing steps performed by the sound processing device of FIG. 3.

FIG. 3 depicts an exemplary sound processing device 300 according to an embodiment of the present invention, and FIG. 4 depicts a flowchart illustrating the method of operation 400 of the sound processing device 300. The sound processing device 300 includes a sound receiving stage 302 in the form of a microphone adapted to receive an input sound signal. In an initial step 402 the sound processing device receives an input sound signal and converts it into a time domain electrical signal. The received sound signal (optionally converted into a frequency domain signal) is applied to a frequency transposition stage 304 which applies a frequency transposition to at least some frequency components of the received sound signal in step 404. The frequency transposition applied by the frequency transposition stage 304 can be of any known type, and include any form of frequency change, shift, modification or removal in which part(s), or all, of the output frequency spectrum of the processing device is different to the corresponding input frequency spectrum.

In step 406, at least some frequency components of the received sound signal are then amplified by the amplification stage 306. Next, in step 408, the output of the amplification stage 306 and the non amplified portions of the output of the frequency transposition stage 304 are combined to form an output signal 309, for reproduction at by the output means 310 of the sound processing device 300. In the case of a hearing aid the output device 310 comprises a hearing aid receiver.

As discussed above at least part of the output signal 309 reproduced by the output means 310 is fed-back by path G to the sound receiving stage 302. In order to substantially cancel the feedback signal G a feedback estimation stage 312 is provided which in step 410 generates an estimated feedback signal G'. The estimated feedback signal is inverted in phase and added to the received sound signal in step 412, by a phase inverting feedback cancelling stage 314.

In order to generate an estimated feedback signal G' the feedback estimation stage 312 receives three input signals. The first input signal 316 represents the output signal 309 of the sound processing device 300. The second input 318 is effectively the input to the sound processing device, and the third input signal 320 is obtained from the frequency transposition stage 304, and represents the components of the input signal that have been transposed in frequency by the frequency transposition stage 304.

By introducing the frequency transposition stage it becomes possible for feedback estimation stage 312 to distinguish between a source signal of long duration (e.g. ~>0.5 s) which has several strong sinusoidal components and the same signal arriving at the input 302, from the output 310 via path G. Whilst the frequency transposition stage 304 is active, any correlation between input signals 318 and 316 that is seen by the feedback estimation stage 312, is due to correlation introduced by the feedback path G rather than by coincidental correlation that exists between the long duration source signal components and output of the output device 310. Therefore, while the frequency transposition stage 304 is operating it is possible for the feedback estimation stage 312 to gain an accurate estimation of the feedback path G alone.

Figure 5:
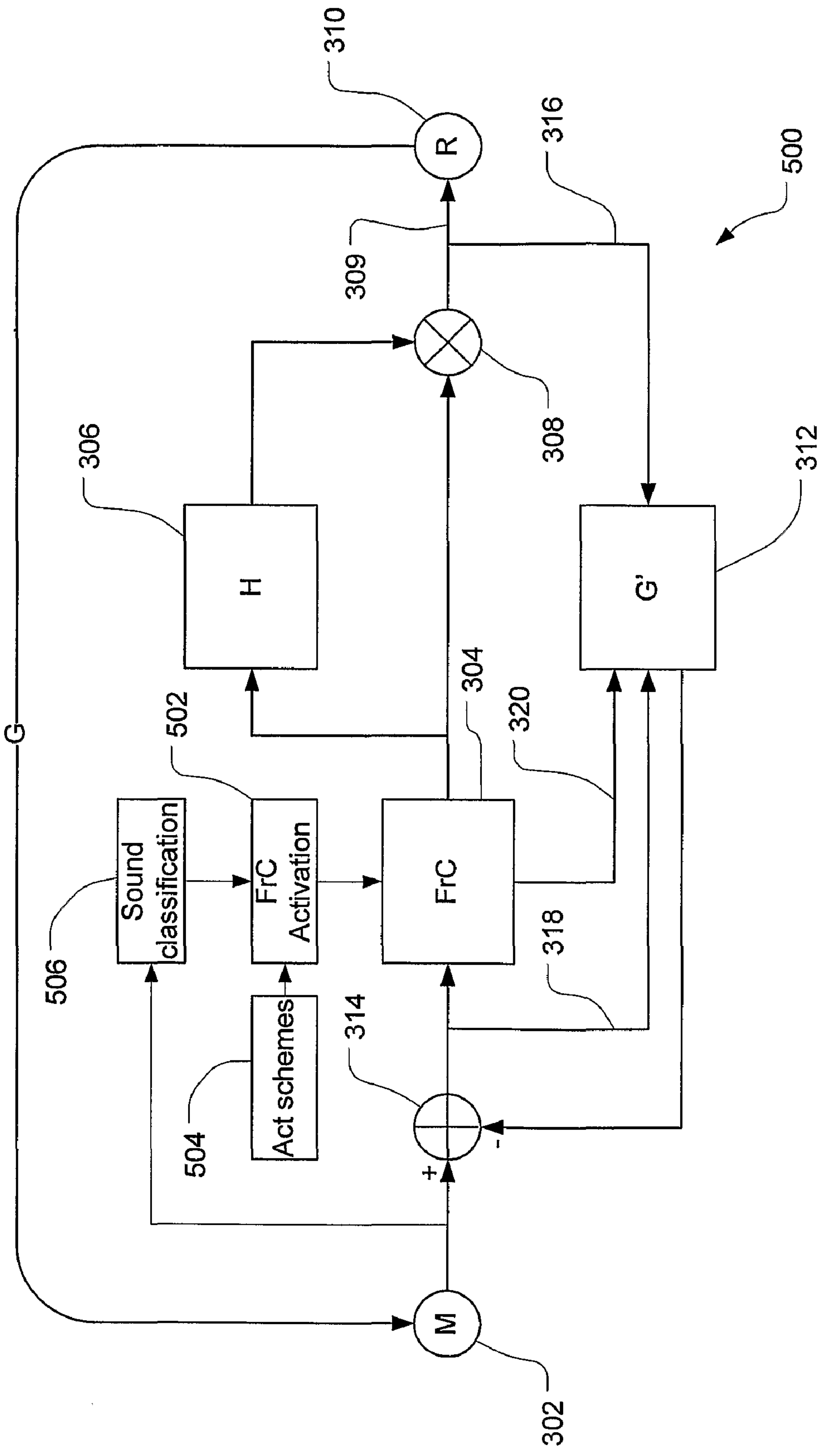
FIG. 5 is a schematic diagram illustrating a sound processing device according to a second embodiment of the present invention.

FIG. 5 depicts a second embodiment of the present invention in which the frequency transposition stage of the sound processing device may be selectively activated and deactivated. In describing this embodiment, features common to the embodiment of FIG. 3 have been numbered with corresponding reference numerals and will not be described again.

In addition to the components described in connection with FIGS. 3 and 4, the sound processing device 500, of FIG. 5 additionally includes a frequency transposition activation stage 502 which activates the frequency transposition stage 304 in accordance with an activation scheme stored in a memory device 504 of the sound processing device 500. As described above, when the frequency transposition stage 304 is activated the feedback activation stage 312 can accurately estimate the feedback path G of the device 500.

Since frequency transposition can introduce audible artefacts, especially when certain types of input sound signals are received, such as classical music, it may be desirable to only implement the frequency transposition stage 304 from time-to-time. For example, the activation scheme 504 may cause the frequency transposition activation component 502 to activate the frequency transposition stage 304 periodically (eg. once per second) and for only a short duration (eg. 20 ms). During the periods in which the frequency transposition stage 304 is activated by the frequency activation component 502 the feedback estimation stage 312 can accurately estimate the feedback path and apply the appropriate feedback estimation signal to the phase inverting feedback cancelling component 314. During these time periods, the rate at which an estimation of the feedback path G is generated is increased to improve feedback cancelling i.e. the adaptation speed of feedback cancelling is increased. During periods of deactivation of the frequency transposition stage 304 a lower adaptation speed is used by decreasing the rate of generating feedback estimates by the feedback estimation stage 312.

In a particularly preferred embodiment the sound processing device 500 additionally includes a sound classification component 506 which is configured to classify the input signal being received by the sound processing device 500, and to cause the frequency transposition activation component 502 to operate under control of a corresponding frequency transposition activation scheme. For example, if the person is listening to classical music it may be undesirable to have the frequency transposition stage active all the time as frequency transposition may introduce audible artefacts into the sound signal. In such an environment the rate of activation of the frequency transposition stage may be reduced or its activation duration shortened. Alternatively, when sound signals are received and frequency artefacts are not of particular concern e.g. when the input signal received is classified as speech, the activation scheme may increase the rate of activation of the frequency transposition stage 304 and/or increase the duration of activation of the frequency transposition stage 304 to improve feedback cancelling. This may be particularly beneficial when the wearer of a hearing aid is in a particularly quiet environment and the gain of the amplification stage 306 is particularly high.

Figure 6:
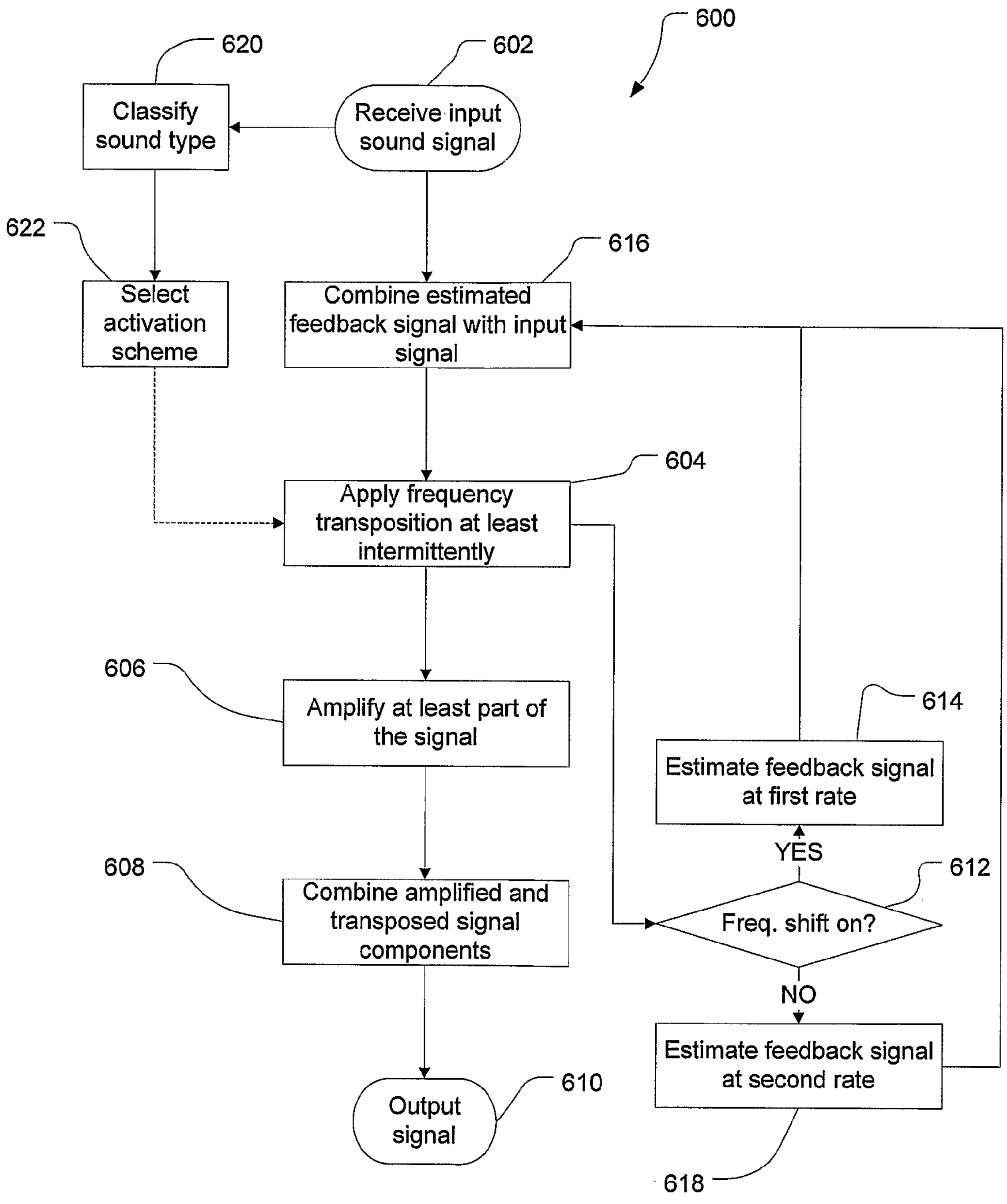
FIG. 6 depicts a flow chart of a method for processing a sound signal according to an embodiment of the present invention.

In order to clarify the operation of the sound processing device 500 of FIG. 5 a flowchart 600 is presented in FIG. 6, which depicts its operation.

In an initial step 602 a sound signal is received. If the frequency transposition stage is activated, in step 604 a frequency transposition is applied to predetermined frequency bands of the input sound signal. Next, at least part of the input signal (either with or without frequency transposition applied) is amplified at 606 by the amplification stage. The amplified components are combined with any un-amplified frequency transposed components in step 608 to generate an output signal 610.

If the frequency transposition is being performed as indicated at 612 an estimated feedback signal is periodically generated by the feedback estimation stage at step 614 at a first rate. On the other hand, in the event that the frequency transposition is not active the estimated feedback signal is periodically generated, in step 618 by the feedback estimation stage at a second rate.

The feedback estimations signals are then combined with the input signal via the phase inverting feedback cancelling stage at step 616. Typically, the rate of feedback estimation when frequency transposition is active is greater than the rate of feedback estimation when frequency transposition is inactive, although the opposite arrangement may be used, or the rates may be the same, in certain circumstances.

As discussed above, the receiver input signal is periodically or continuously, classified in step 620 and in step 622 the classification is used to determine the corresponding frequency transposition activation scheme for use in step 604 by the frequency transposition stage to control its pattern of activation and deactivation. The classification determined in step 620 can also be used to determine the first and second rates of feedback estimation.

As can be seen from the foregoing, embodiments of the present invention provide an effective de-correlation between the input signal and output signal of a sound processing device by transposing at least a portion of the output signal to another frequency region. As will be appreciated a relationship exists between the amount of frequency transposition applied and the resulting de-correlation strength. In this regard, increasing the frequency transposition leads in general to increased de-correlation. However the benefits of this de-correlation need to be weighed against the competing desire for realistic pitch reproduction in the amplified signal. For systems which work in the frequency domain a comfortable method is to transpose the input spectra an integer number of frequency bin's (e.g. −1, −2), possibly for frequencies only above a certain frequency region (e.g. 800 Hz).

In systems with periodic activation of the frequency transposing stage, when the frequency transposition is activated the system can obtain a very accurate estimation of the feedback path alone. This information can then be used to increase the adaptation speed of the feedback cancellation system when frequency transposition is activated and to decrease the adaptation speed of the feedback cancellation system when frequency transposition is deactivated. In some instances feedback estimation may be stopped when the frequency transposition stage is inactive.

In an alternative form the input sound signal can be captured by an external microphone and provided to processing device as an analogue or digital representation of the input sound signal.

Embodiments of the present invention can lead to a more stable and more accurate estimation of the real feedback path and therefore to a more effective feedback cancelling and a better sound quality in general, since the feedback cancellation system acts less strongly on source signal correlations.

It will be understood that the invention disclosed and defined in this specification extends to all alternative combinations of two or more of the individual features mentioned or evident from the text or drawings. All of these different combinations constitute various alternative aspects of the invention.

The claims defining the invention are as follows:

1. A method of processing a sound signal in a sound processing device, the method including:

(a) receiving an input sound signal;

(b) applying a frequency change to one or more frequency components of the input sound signal, at least intermittently;

(c) amplifying at least a portion of the input sound signal;

(d) generating an estimated feedback signal corresponding to a feedback path of the sound processing device at least when said frequency transposition is applied; and (e) combining the input sound signal with a phase inverted representation of the estimated feedback signal to cancel feedback from the input sound signal.

2. A method of processing a sound signal according to claim 1 wherein the frequency change is selectively activated or deactivated.

3. A method of processing a sound signal according to either of claims 1 or 2 wherein the method further includes:

classifying the input sound signal;

applying a frequency transposition activation scheme on the basis of said classification.

4. A method of processing a sound signal according to any one of claims 1 to 3 wherein during a period in which a frequency change is applied to one or more frequency components of the input sound signal, steps (d) and (e) are performed such that the feedback cancellation is performed with a first adaptation speed.

5. A method of processing a sound signal according to claim 4 wherein during a period in which a frequency change is not applied, steps (d) and (e) are performed such that the feedback cancellation is performed with a second adaptation speed.

6. A method of processing a sound signal according to claim 5 wherein the first adaptation speed is faster than the second adaptation speed.

7. A method of processing a sound signal according to any one of claims 1 to 6 wherein estimated feedback signal is generated on the basis of an output of at least one of: the sound processing device; a sound receiving stage of the sound processing device; a frequency transposition stage of the sound processing device; and an amplification stage of the sound processing device.

8. A sound processing device including:

a sound receiving stage for receiving a sound signal;

frequency transposition stage for applying frequency change to at least one frequency component of the received sound signal;

an amplification stage configured to amplify at least part of the received sound signal;

a feedback estimation stage configured to generate an estimated feedback signal on the basis of an output of at least one of the sound receiving stage, the frequency transposition stage, the amplification stage and the sound processing device; and a phase inverting feedback cancelling stage configured to combine the estimated feedback signal with the input signal to cancel a feedback component of the sound signal received at the sound receiving stage.

9. A sound processing device according to claim 8 which further includes frequency transposition activation stage configured to activate and/or deactivate the frequency transposition stage.

10. A sound processing device according to either one of claims 8 or 9 wherein a rate of feedback estimation of the feedback estimation stage is variable.

11. A sound processing device according to claim 10 wherein the feedback estimation stage is configured to estimate the feedback signal at a first rate when the frequency transposition stage is activated.

12. A sound processing device according to claim 11 wherein the feedback estimation stage is configured to estimate the feedback signal at a second rate when the frequency transposition stage is inactive.

13. A sound processing device according to claim 12 wherein the first rate is higher than the second rate.

14. A sound processing device according to any one of claims 9 to 13 wherein the device further includes a sound classification stage configured to classify the received sound signal and cause the frequency transposition activation stage to control the operation of the frequency transposition stage in accordance with one of a plurality of frequency transposition activation schemes.

15. A sound processing device according to claim 14 wherein the frequency transposition activation stage is configured to periodically activate the frequency transposition stage.

16. A sound processing device according to claim 15 wherein the frequency transposition activation stage is configured to activate the frequency transposition stage at an activation rate dependent upon the determined classification of the received sound signal.

17. A sound processing device according to claim 15 wherein a duration of activation of the frequency transposition stage is determined on the basis of the determined classification of the received sound signal.

18. A sound processing device according to any one of the preceding claims wherein the sound receiving stage is configured to receive either an acoustic signal or data signal representing an acoustic signal.

* * * * *